(12) United States Patent
Bovington et al.

(10) Patent No.: US 10,782,475 B2
(45) Date of Patent: Sep. 22, 2020

(54) III-V COMPONENT WITH MULTI-LAYER SILICON PHOTONICS WAVEGUIDE PLATFORM

(71) Applicant: Cisco Technology, Inc., San Jose, CA (US)

(72) Inventors: Jock T. Bovington, La Mesa, CA (US); Kenneth J. Thomson, San Francisco, CA (US); Dominic F. Siriani, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/433,846

(22) Filed: Jun. 6, 2019

(65) Prior Publication Data

US 2020/0124794 A1    Apr. 23, 2020

Related U.S. Application Data

(60) Provisional application No. 62/748,137, filed on Oct. 19, 2018.

(51) Int. Cl.
*G02B 6/12* (2006.01)
*G02B 6/122* (2006.01)
*G02B 6/13* (2006.01)

(52) U.S. Cl.
CPC ........... *G02B 6/1225* (2013.01); *G02B 6/131* (2013.01); *G02B 2006/1213* (2013.01); *G02B 2006/12061* (2013.01)

(58) Field of Classification Search
CPC ................. G02B 6/1225; G02B 6/131; G02B 2006/12061; G02B 2006/1213
See application file for complete search history.

(56) References Cited

U.S. PATENT DOCUMENTS

| 10,295,742 B2* | 5/2019 | Hassan | H01S 5/3412 |
| 2013/0322813 A1* | 12/2013 | Grondin | G02B 6/1223 385/14 |
| 2015/0226918 A1* | 8/2015 | Bauters | G02B 6/1225 385/14 |
| 2018/0059329 A1* | 3/2018 | Boutami | G02B 6/305 |

OTHER PUBLICATIONS

Géza Kurczveil, et al, Robust hybrid quantum dot laser for integrated silicon photonics, Optics Express, vol. 24, issue 14, pp. 16167-16174 (2016) (available at: https://www.osapublishing.org/oe/abstract.cfm?uri=oe-24-14-16167).

* cited by examiner

*Primary Examiner* — Ellen E Kim

(74) *Attorney, Agent, or Firm* — Patterson + Sheridan, LLP

(57) ABSTRACT

Embodiments provide for a photonic platform, comprising: a silicon component; a III-V component; and a bonding layer contacting the silicon component on one side and the III-V component on the opposite side; wherein the silicon component comprises: a silicon substrate; a dielectric, contacting the silicon substrate on one face and the bonding layer on the opposite face; a silicon cores disposed in the dielectric; and wherein the III-V component comprises: a III-V cladding; a III-V contact, having a first side that contacts the bonding layer; and an active region, disposed on the III-V contact and separating the III-V contact from the III-V cladding, wherein the active region is located relative to the silicon cores to define an optical path that includes the active region and the silicon cores.

20 Claims, 9 Drawing Sheets

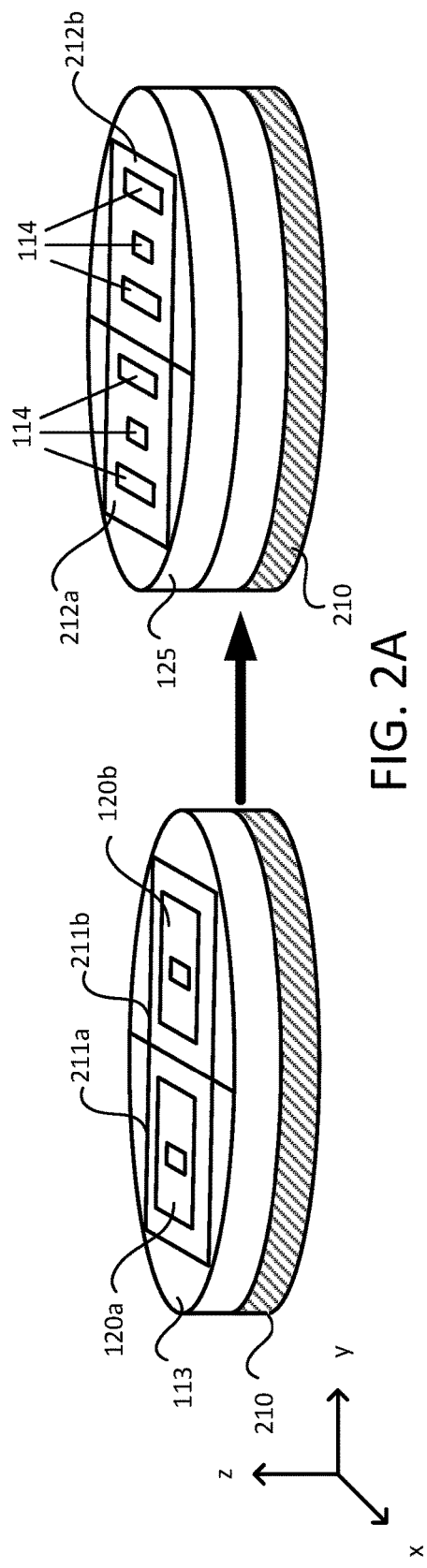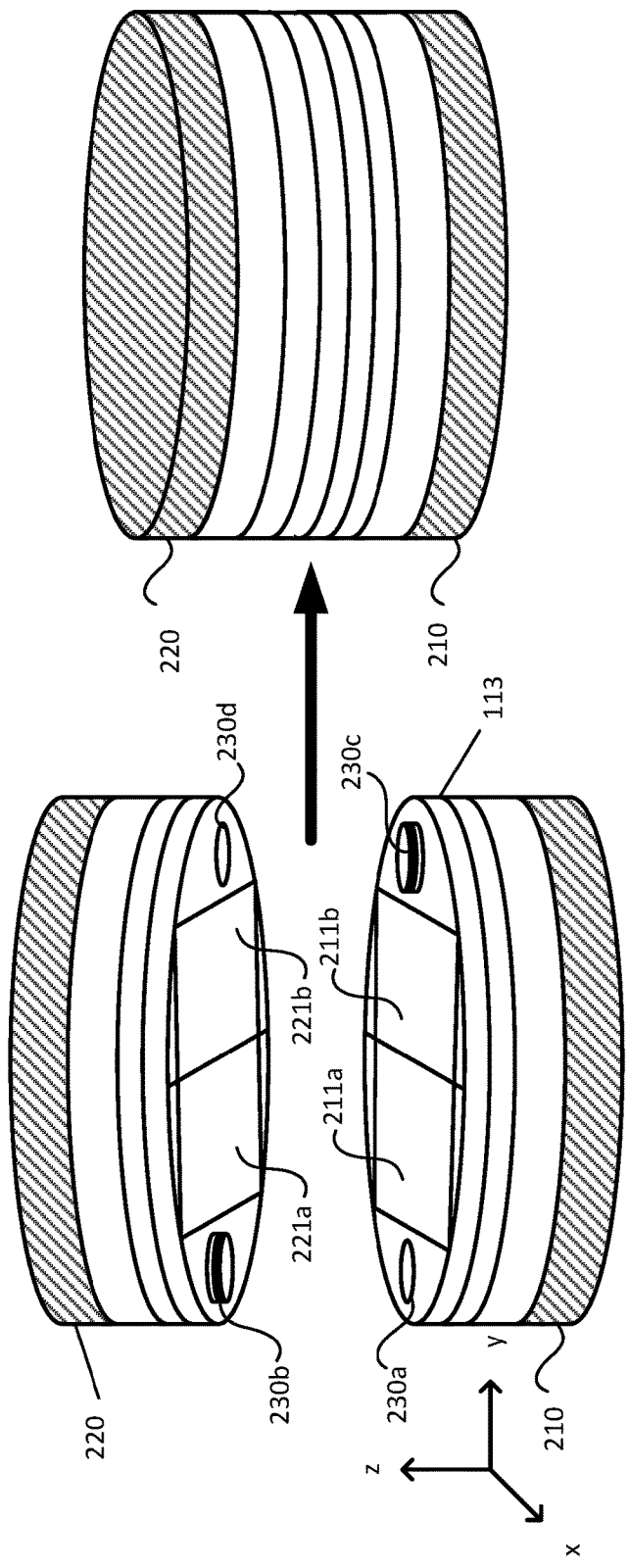

III-V COMPONENT WITH MULTI-LAYER SILICON PHOTONICS WAVEGUIDE PLATFORM

CROSS-REFERENCE TO RELATED APPLICATIONS

This application claims benefit of co-pending U.S. provisional patent application Ser. No. 62/748,137, filed Oct. 19, 2018. The aforementioned related patent application is herein incorporated by reference in its entirety.

TECHNICAL FIELD

Embodiments presented in this disclosure generally relate to photonic platforms with integrated III-V components. More specifically, embodiments disclosed herein provide for improvements to bonding III-V components with photonic platforms that include multiple layers or cores of silicon.

BACKGROUND

Photonics platforms include several individually fabricated elements that are packaged together into a single optoelectronic element or circuit. For example, a laser element may be packaged together with another element that includes waveguides, thermal or electro-optic phase modulators, photodetectors, and chip-to-chip connectors that are formed in a separate die. Differences in the materials used to construct the individual components can lead to back reflections, limited optical ranges of operation, limited operational temperature ranges, and/or time and material intensive work arounds.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 2A & 2B illustrate wafer-level assembly of silicon components with III-V components to form photonic platforms, according to embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
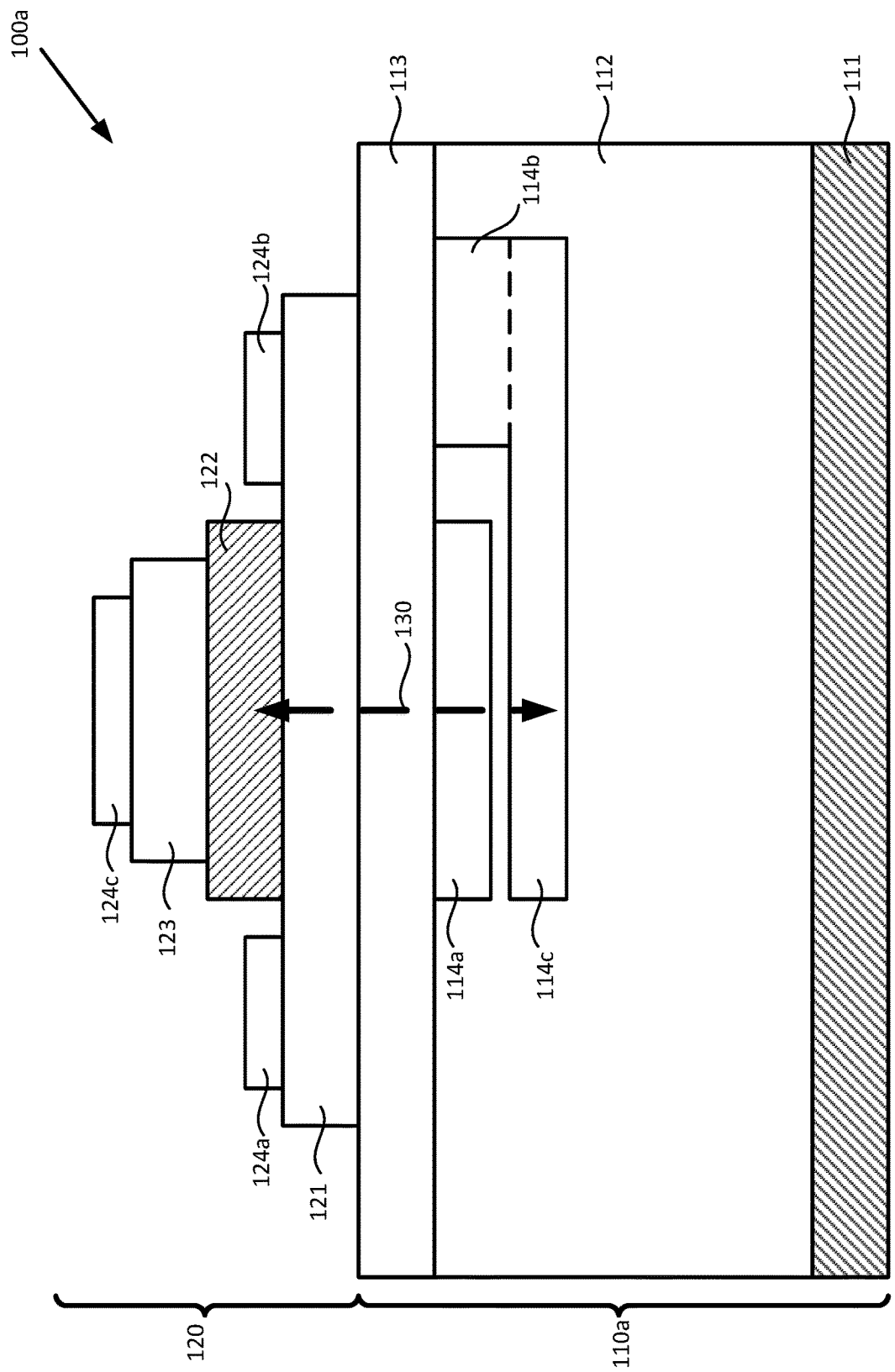
FIGS. 1A-1C illustrate cross-sectional views of various photonic platforms, according to embodiments of the present disclosure.

One embodiment presented in this disclosure provides for method comprising: providing a silicon component, comprising: a dielectric bonded on a first side to a substrate and to a bonding layer on a second side, opposite to the first side; a first silicon core disposed at a first location within the dielectric contacting the bonding layer; and a second silicon core disposed within the dielectric between the first silicon core and the substrate; and bonding a III-V material to the bonding layer such that a III-V contact defined in the III-V material, the first silicon core, and the second silicon core are aligned to form an optical path. In some embodiments, bonding the III-V material to the bonding layer further comprises: mounting a base wafer, including a base substrate and a base layer of the III-V material, to the bonding layer; and forming a III-V component after mounting the base wafer to the silicon component, wherein forming the III-V component comprises: removing the base substrate; thinning the base layer to a predefined thickness to form a contact layer; forming an active layer on the contact layer; forming a cladding layer on the active layer; patterning the contact layer into the III-V contact, the III-V contact having a first predefined shape at a first location relative to the first silicon core; patterning the active layer into an active region of a second predefined shape at a second location relative to the first silicon core; and patterning the cladding layer into a cladding of a third predefined shape at a third location relative to the first silicon core. In other embodiments, in which the III-V contact is part of a pre-processed III-V component that comprises an active region that is aligned with the first silicon core and second silicon core in the optical path when bonded to the bonding layer.

One embodiment presented in this disclosure provides for a photonic platform, comprising: a silicon component; a III-V component; a bonding layer contacting the silicon component on a first side and the III-V component on a second, opposite side; wherein the silicon component comprises: a silicon substrate; a dielectric, contacting the silicon substrate on first face and the bonding layer on a second face, opposite to the first face; a first silicon core disposed in the dielectric and contacting the bonding layer; and a second silicon core disposed in the dielectric between the first silicon core and the silicon substrate; and wherein the III-V component comprises: a III-V cladding; a III-V contact, having a first side and a second side, wherein the first side contacts the bonding layer; and an active region, disposed on the second side of the III-V contact and separating the III-V contact from the III-V cladding, wherein the active region is located relative to the first silicon core and the second silicon core to define an optical path that includes the active region, the first silicon core, and the second silicon core.

One embodiment presented in this disclosure provides for a wafer, comprising: a plurality of dies defined on a substrate, wherein each die of the plurality of dies comprises: a bonding layer; a dielectric, separating the substrate from the bonding layer; a first silicon core embedded in the dielectric and contacting the bonding layer; and a second silicon core embedded in the between the first silicon core and the substrate; and a plurality of III-V components, wherein each III-V component of the III-V components comprises: a III-V contact having a first side and a second side; an active region connected to the first side of the III-V contact; and wherein the second side of the III-V contact for each III-V component of the plurality of III-V components is bonded to the bonding layer of a corresponding die of the plurality of dies to define an optical path traveling from the active region to the first silicon core and the second silicon core.

EXAMPLE EMBODIMENTS

By producing a multi-core silicon component and bonding a III-V component to the multi-core silicon component according to the present disclosure, a photonic platform with an integrated III-V component with improved operational characteristics and ease of manufacture is provided.

As discussed herein, a III-V material has a material matrix including a Group III element (e.g., B, Al, Ga, In, Tl) and a Group V element (e.g., N, P, As, Sb, Bi), and may be doped with various dopants to produce one or more quantum dots, quantum wells, quantum wires, etc., or to exhibit a given conductivity (e.g., n-type or p-type). The III-V material may be constructed in several layers of different materials (or doping concentrations thereof) that amplify or direct light into or out of particular regions of a III-V component. In various embodiments, the III-V component may include an active gain medium such as a laser, a photo-detector, a phase sectionalizer, a saturable absorber, a modulator, etc.

The silicon component includes one or more phase modulators and wave guides to guide light into or out of the III-V component. Depending on the processes and particular materials used by the fabricator of the III-V component, the processes used to bond the two components together (including aligning, surface reflection matching, and cleaving the components into individual dies/platforms) may be unique for a given construction (e.g., a given model) of a III-V component, increasing the complexity of forming photonic platforms. Instead, by bonding the III-V component to the silicon component using an $Al_2O_3$ non-conductive bond or a conductive wafer bond made under vacuum (e.g., less than 3 kilopascals (kPa)), a more consistent process may be applied to various III-V components received from different fabricators or produced with different materials. The resulting photonic platform enables low optical losses between the III-V component and the silicon component and a simpler mode of manufacture across different materials, models of components, and manufacturers.

Figure 1B:
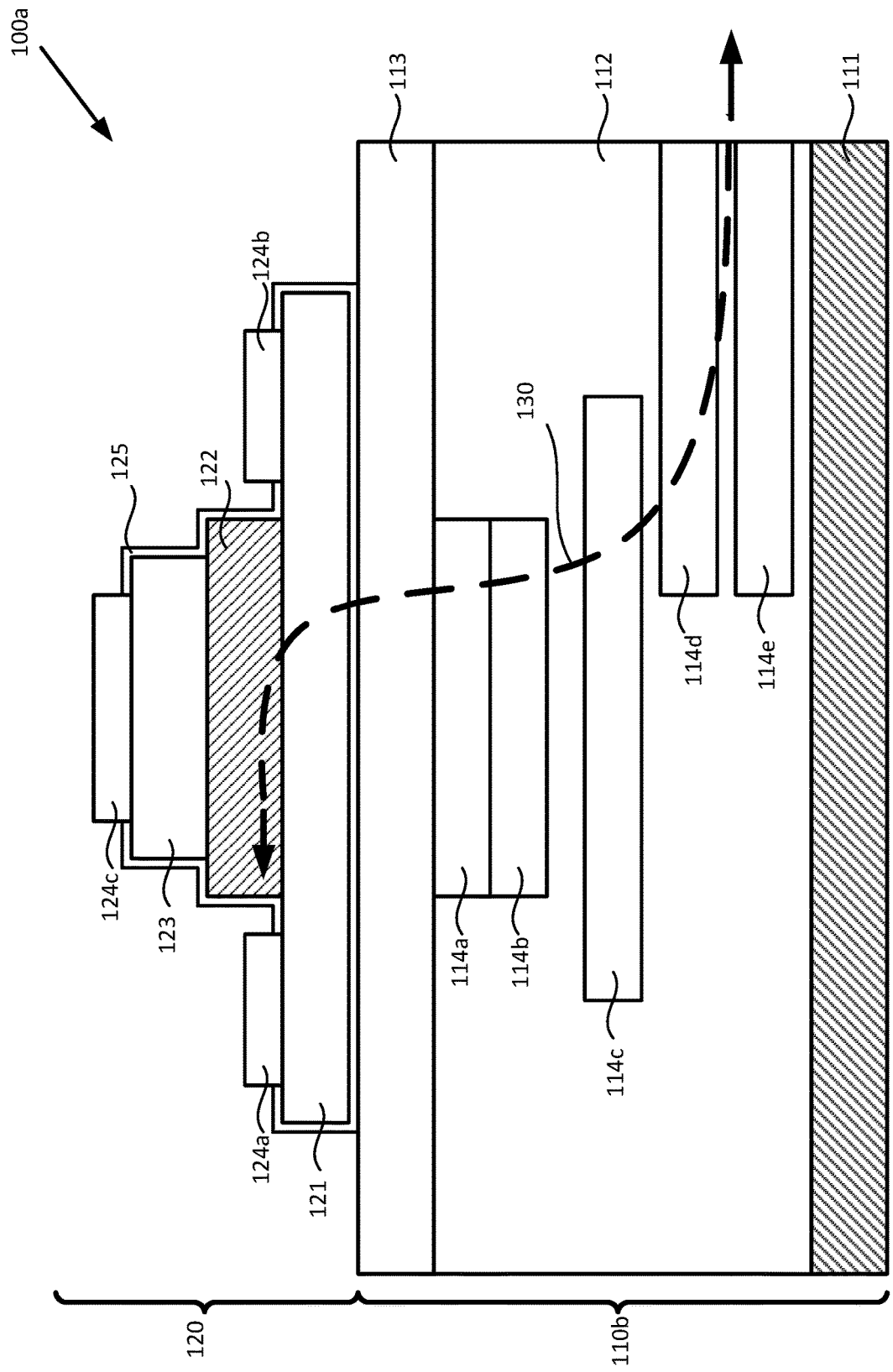
Figure 1C:
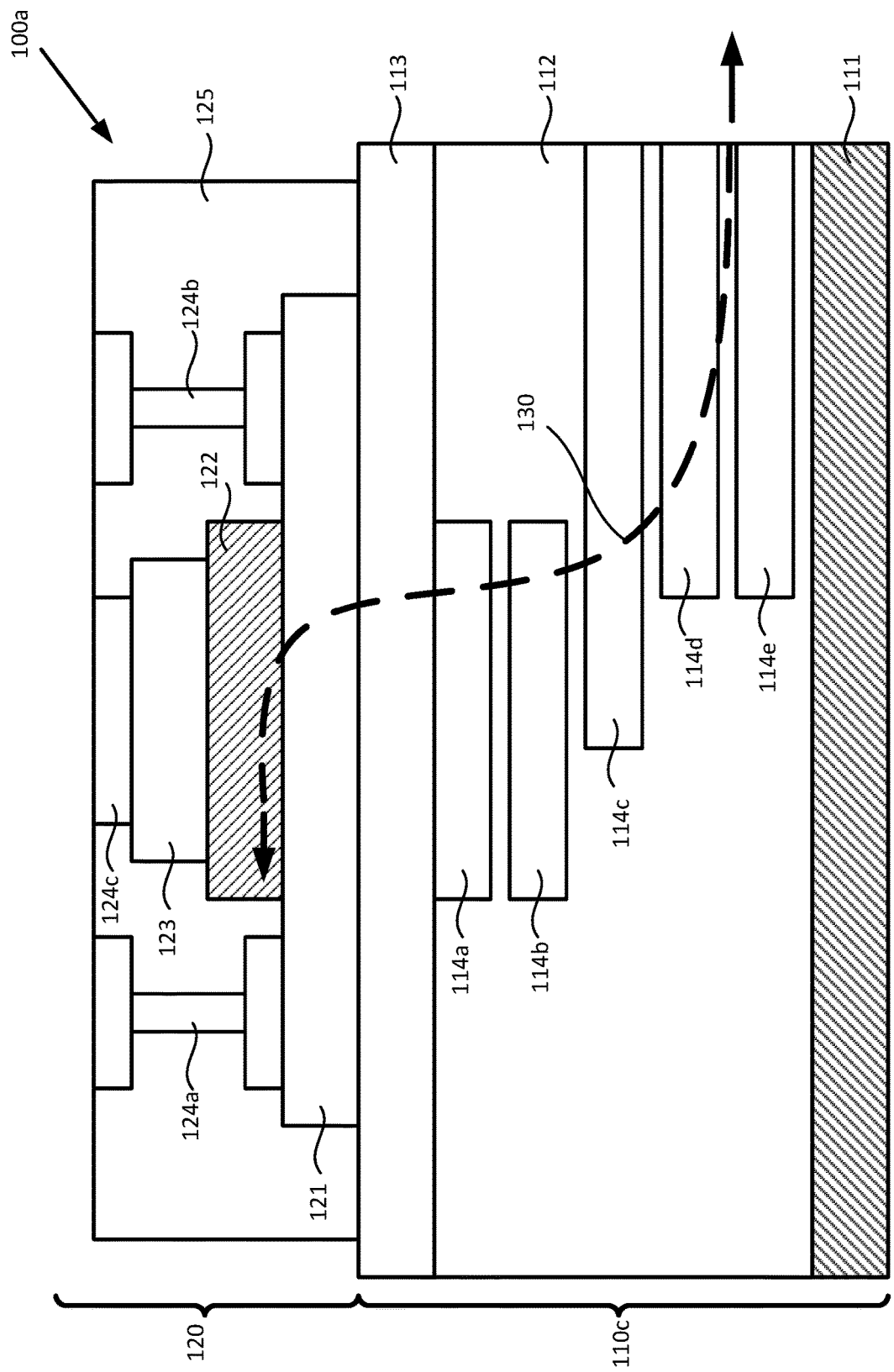

FIGS. 1A-1C illustrate cross-sectional views of various photonic platforms 100a-c (generally, photonic platform 100), according to embodiments described herein. Each of the illustrated photonic platforms 100a-c include a silicon component 110a-c (generally, silicon component 110) bonded with a III-V component 120. Although three example layouts are provided for the silicon components 110a-c in FIGS. 1A-1C, other layouts are contemplated. Similarly, although each of the III-V components 120 illustrated in FIGS. 1A-1C share a similar layout, other layouts are contemplated.

The III-V components 120 illustrated in FIGS. 1A-1C include a III-V contact 121 made of a III-V material, an active region 122 made of a III-V material in which quantum dots, quantum wells, or quantum wires are defined, and a III-V cladding 123 made from a III-V material. The active region 122 is located between the III-V contact 121 and the III-V cladding 123, and may be epitaxially grown from one of the III-V contact 121 or the III-V cladding 123, depending on the direction of layering during formation. In various embodiments, the III-V material used in the active region 122 is different than the III-V material used in the III-V contact 121 and the III-V cladding 123.

The insulator 125 (shown only in FIGS. 1B and 1C) encapsulates and passivates the III-V materials of the III-V component 120. Specifically, FIG. 1B illustrates a III-V component 120 that is applied as a surface layer around the III-V material and FIG. 1C illustrates a III-V component 120 with an insulator 125 applied as a block of material around the III-V component 120. In various embodiments, the insulator 125 is made from silicon dioxide ($SiO_2$), although other insulative materials are contemplated. In some embodiments, a fabricator applies the insulator 125 before bonding the III-V component 120 to the silicon component 110. In some embodiments, the fabricator applies the insulator 125 when forming a wafer including several instances of the III-V component 120. In some embodiments, the fabricator applies the insulator 125 to individual III-V components 120. In some embodiments, a fabricator applies the insulator 125 (including additional insulative material to an already-applied insulator 125) after the III-V component 120 is bonded to the silicon component 110. In embodiments in which the fabricator applies the insulator 125 prior to bonding the III-V component 120 with the silicon component 110, the bottom surface of the III-V contact 121 may be exposed or left free from the insulator 125 to facilitate bonding the III-V contact 121 with the silicon component 110.

The III-V components 120 illustrated in FIGS. 1A-1C include three metallizations 124a-c (generally, metallization 124), which provide points of electrical contact to portions of the III-V component 120 embedded in the insulator 125. Embodiments with more of fewer than three metallizations 124 are contemplated. The metallizations 124 may include contact pads on the III-V materials (e.g., on the III-V contact 121 and III-V cladding 123), contact pads exposed on a free surface of the photonic platform 100, and Through Silicon Vias (TSVs) or other traces within the insulator 125 to establish external electrical contacts with the III-V component 120 through the insulator 125. A fabricator or end-user may connect various electrical circuits to the metallizations 124 to apply a current across the active region (e.g., to activate a laser) or to monitor a voltage different across the III-V component 120 (e.g., from a photo sensor).

A fabricator bonds a first face of the III-V contact 121 (opposite to a second face on which the active region is 122 is connected to the III-V contact 121) of the III-V component 120 to a bonding layer 113 of a silicon component 110 to assemble the photonic platform 100. In some embodiments, the bonding layer 113 is made of $Al_2O_3$, and the fabricator mates the two surfaces together via an $O_2$ plasma-assisted process to create a non-conductive bond between the III-V component 120 and the silicon component 110. In some embodiments, the bonding layer 113 is made of $SiO_2$, and the fabricator mates the two surfaces together via a conductive wafer bond made under vacuum with either no interface material or a conductive interface material used to coat or dope the bonding layer 113 (e.g., Ti). Although primarily discussed herein as part of the silicon component 110, it is contemplated that the bonding layer 113 (or a portion thereof) may be fabricated as part of the III-V component 120.

Each of the silicon components 110a-c illustrated in FIG. 1A-1C include at least a first silicon core 114a (generally, silicon core 114) and a second silicon core 114b that are disposed in a dielectric 112, such as $SiO_2$, bonded with a silicon substrate 111 (also referred to as a carrier or handle substrate 111). In various embodiments, the substrate 111 is a Si wafer bonded to the dielectric 112 after the dielectric 112 has been applied to encapsulate the silicon cores 114. A fabricator may form and pattern the silicon cores 114 and the dielectric 112 in several layers formed on an original substrate 116 (not shown) that is removed after the handle substrate 111 is bonded to the dielectric 112. By adding the handle substrate 111, and removing the original substrate 116, a fabricator can flip the orientation of the silicon component 110, thereby repositioning silicon cores 114 formed close to the original substrate 116 (and deep from an original surface) closer to the surface exposed by the removal of the original substrate 116.

The locations of the silicon cores 114 in the dielectric 112, relative to one another and the bonding layer 113, are selected to form the portion of an optical path 130 traveling through the silicon component 110 and ensure optical coupling with the III-V component 120. The silicon cores 114 include elements that may be electrically powered and elements that are passive or unpowered. For example, a first silicon core 114a may form a first element (e.g., a drain) of a CMOS (Complementary Metal-Oxide Semiconductor) and a second silicon core 114b may form a second element (e.g., a source) of the CMOS that are separated by a gate oxide layer of a predetermined thickness and connected to different electrical leads to bias the CMOS by an applied voltage difference. In another example, a first silicon core 114a and a second silicon core 114b may be made from Silicon Nitride (SiN) and are separated by a predefined distance from one another to produce a waveguide for light carried in the silicon component 110. In various embodiments, there is an adiabatic transition from the III-V material of the III-V component to the silicon cores 114 and adiabatic transitions between the silicon cores 114 (e.g., between a Silicon first silicon core 114a and a Silicon Nitride (SiN) second silicon core 114b).

The silicon component 110a illustrated in FIG. 1A is an example of an optical modulator that includes a first silicon core 114a, a second silicon core 114b, and a third silicon core 114c. The first silicon core 114a is composed of a monocrystalline silicon doped to exhibit a first conductivity type (e.g., n-type) and etched into a first predefined shape, which is in contact with the bonding layer 113. A second silicon core 114b, also in contact with the bonding layer 113, is etched into a second predefined shape and extends to a greater depth into the dielectric than the first silicon core 114a, where the second silicon core 114b joins a third silicon core 114c. The third silicon core 114c extends in parallel to the first silicon core 114a, and is separated from the first silicon core 114a by a predefined distance. The third silicon core 114c is etched or formed into a third predefined shape and is composed of a monocrystalline silicon doped to exhibit a second conductivity type (e.g., p-type), different from the first conductivity type. In some embodiments, the first silicon core 114a and the second silicon core 114b are etched into the respective predefined shapes from one layer of silicon, and the third silicon core 114c is formed via selective are growth (SAG) in a cavity defined in the dielectric 112. As illustrated in FIG. 1A, an optical path 130 extends from active region 122 to the first silicon core 114a and the third silicon core 114c, and other elements (not illustrated) may further direct the optical path 130 into or out of the illustrated cross-sectioned plane.

The silicon component 110b illustrated in FIG. 1B includes a plurality of silicon cores 114a-e composed of different materials. The first silicon core 114a is composed of a polycrystalline silicon doped to exhibit a first conductivity type (e.g., n-type) and etched into a first predefined shape, which is in contact with the bonding layer 113. A second silicon core 114b, in contact with the first silicon core 114a, is composed of a monocrystalline silicon doped to exhibit the same conductivity type as the first silicon core 114a, and is etched into a second predefined shape. Although presented here as separate silicon cores 114, the first and second silicon cores 114a, 114b of FIG. 1B may be treated as one silicon core 114, where a first face of the first silicon core 114a is in contact with the bonding layer, and a second face (opposite to the first face) of the first silicon core 114a is in contact with the second silicon core 114b. A third silicon core 114c extends in parallel to the second silicon core 114b, and is separated from the second silicon core 114b by a predefined distance. The third silicon core 114c is etched or formed into a third predefined shape and is composed of a polycrystalline silicon doped to exhibit a second conductivity type (e.g., p-type), different from the first conductivity type. The fourth and fifth silicon cores 114d-e are waveguides composed of SiN that are formed into predefined shapes at predefined distances from one another and the third silicon core 114c to direct an optical path 130 that extends from the active region 122 through the silicon cores 114 and out of the illustrated photonic platform 100.

The silicon component 110b illustrated in FIG. 1C includes a plurality of silicon cores 114a-e composed of different materials. The first silicon core 114a is composed of a monocrystalline silicon doped to exhibit a first conductivity type (e.g., n-type) and etched into a first predefined shape, which is in contact with the bonding layer 113. A second silicon core 114b extends in parallel to the first silicon core 114a (relative to the bonding layer 113), and is separated from the first silicon core 114a by a predefined distance. The second silicon core 114b is etched or formed into a second predefined shape and is composed of a monocrystalline silicon doped to exhibit a second conductivity type (e.g., p-type), different from the first conductivity type. The third through and fifth silicon cores 114c-e are waveguides composed of SiN that are formed into predefined shapes at predefined distances from one another and the second silicon core 114b to direct the optical path 130 that extends from the active region 122 through the silicon cores 114 and out of the illustrated photonic platform 100.

FIGS. 2A and 2B illustrate wafer-level assembly of silicon components 110 with III-V components 120 to form photonic platforms 100. Once assembled, the photonic platforms 100 may be tested at the wafer scale, and may be cleaved into individual photonic platforms 100.

FIG. 2A illustrates a component-to-wafer assembly of the III-V components 120 to a silicon component wafer 210 that includes at least two silicon dies 211a, 211b (generally, silicon die 211). Each silicon die 211 includes a silicon component 110 defined on the silicon component wafer 210. The individual III-V components 120a, 120b are paired with a corresponding silicon die 211, and bonded to the bonding layer 113 thereof before the photonic platforms 100 are finalized. To finalize the photonic platform 100, a fabricator may apply an insulator 125 over the bonding layer 113 and the III-V components 120 to passivate the wafer-level assembly, and may form metallizations 124 (including TSVs) in electrical contact with one or more portions of the photonic platform 100 disposed within the dielectric 112.

FIG. 2B illustrates a wafer-to-wafer assembly of a III-V component wafer 220 that includes at least two III-V dies 221a, 221b (generally, III-V die 221) that include a III-V component 120 defined on the III-V component wafer 220 with a silicon component wafer 210 including a corresponding number of silicon dies 211 that each define a silicon component 110. When bonding the silicon component wafer 210 and III-V component wafer 220 together, the faces of the wafers 210, 220 are aligned with one another so that the respective plurality of dies 211, 221 defined in each wafer 210, 220 mate with one another. By mating a first and a second plurality of dies 211, 221 together that are formed from separate wafers 210, 220, a fabricator may use different processes and materials (which may be otherwise incompatible with one another) to form the different components of a photonic platform 100.

In various embodiments, the faces of the wafers 210, 220 that are to be bonded together include various alignment features 230 (e.g., wafer level alignment features) that are matched with alignment features 230 present on the other wafer. For example, as illustrated in FIG. 2B, the silicon component wafer 210 includes a first alignment feature 230a paired with a second alignment feature 230b included on the III-V component wafer 220, and a third alignment feature 230c paired with a fourth alignment feature 230d included on the III-V component wafer 220. Although two pairs of alignment features 230 are illustrated in FIG. 2B (which are presented as cylindrical depressions and projections), a wafer may include more or fewer alignment features 230 having various shapes and orientations in other embodiments. In some embodiments, the alignment features 230 are defined on a face of the wafers 210, 220 in an area not occupied by the dies 211, 221, such as the first alignment feature 230a and second alignment feature 230b illustrated in FIG. 2B, but in other embodiments, the dies 211, 221 may include alignment feature 230.

Figure 3:
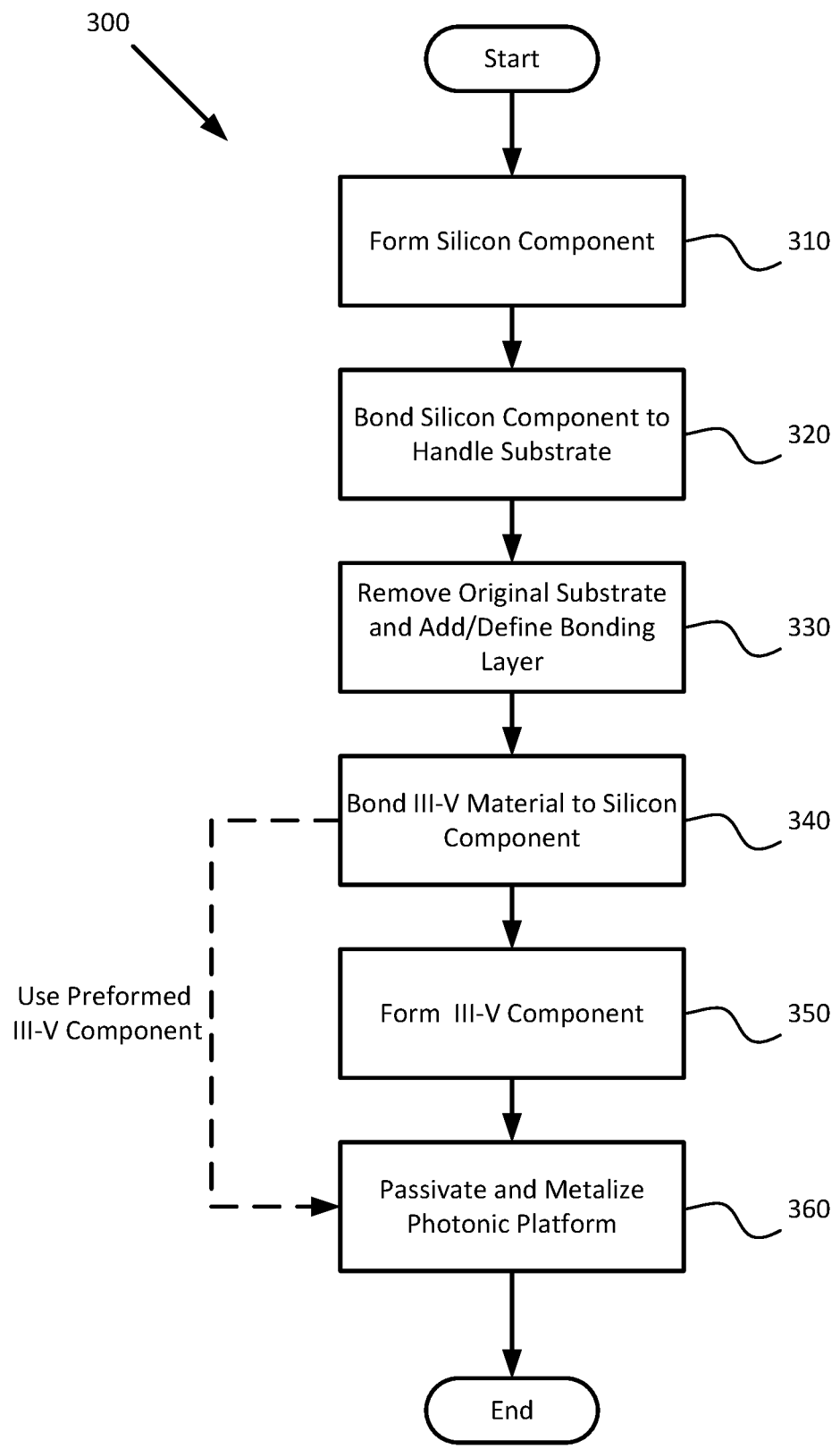
FIG. 3 is a flowchart of a method for fabricating a photonic platform, according to embodiments of the present disclosure.

FIG. 3 is a flowchart for a method 300 for fabricating a photonic platform 100. FIGS. 4A-4F illustrate various stages of fabrication for a photonic platform 100, which may be understood in conjunction with method 300. Although illustrated on an individual die level, FIGS. 4A-4H are applicable to wafer level fabrication processes in which method 300 is performed at the same time on several individual dies included in a wafer. Method 300 begins with block 310, where a fabricator forms or supplies a silicon component 110, such as the silicon component 110 illustrated in FIG. 4A. The silicon component 110 includes an original substrate 116, on which a dielectric 112 is formed. The dielectric 112 includes several silicon cores 114 disposed therewithin, which may include silicon cores 114 formed as a layer of silicon on the dielectric 112 and etched into a predefined shape, silicon cores 114 formed via selective area growth in a cavity defined in the dielectric 112, and silicon cores 114 formed on other silicon cores 114 (e.g., a layer of monocrystalline silicon formed on a layer of polycrystalline silicon).

Figure 4A:
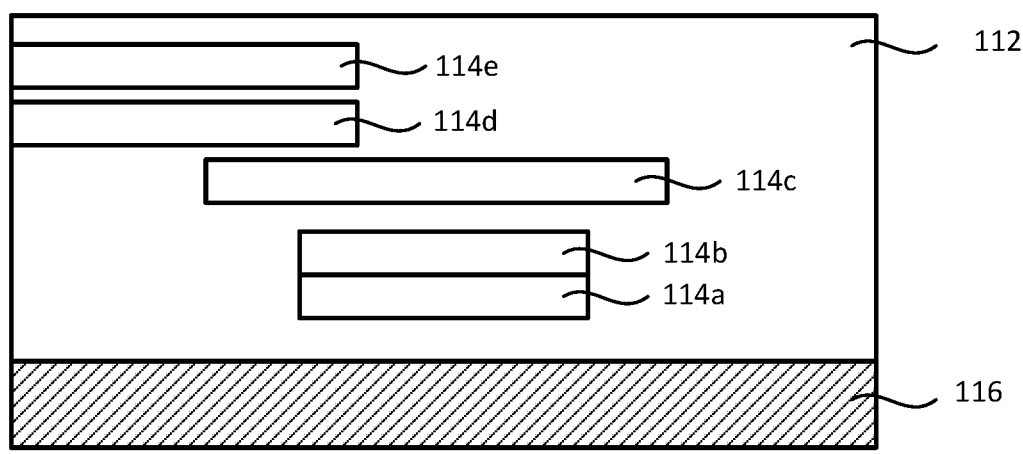
FIG. 4A-4H illustrate various stages of fabrication for a photonic platform, according to embodiments of the present disclosure.
Figure 4B:
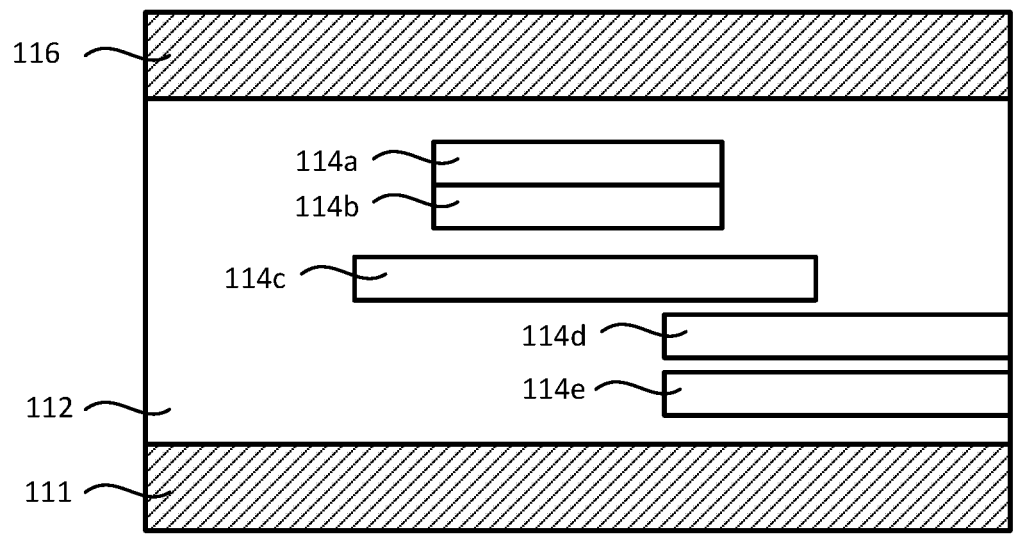
Figure 4C:
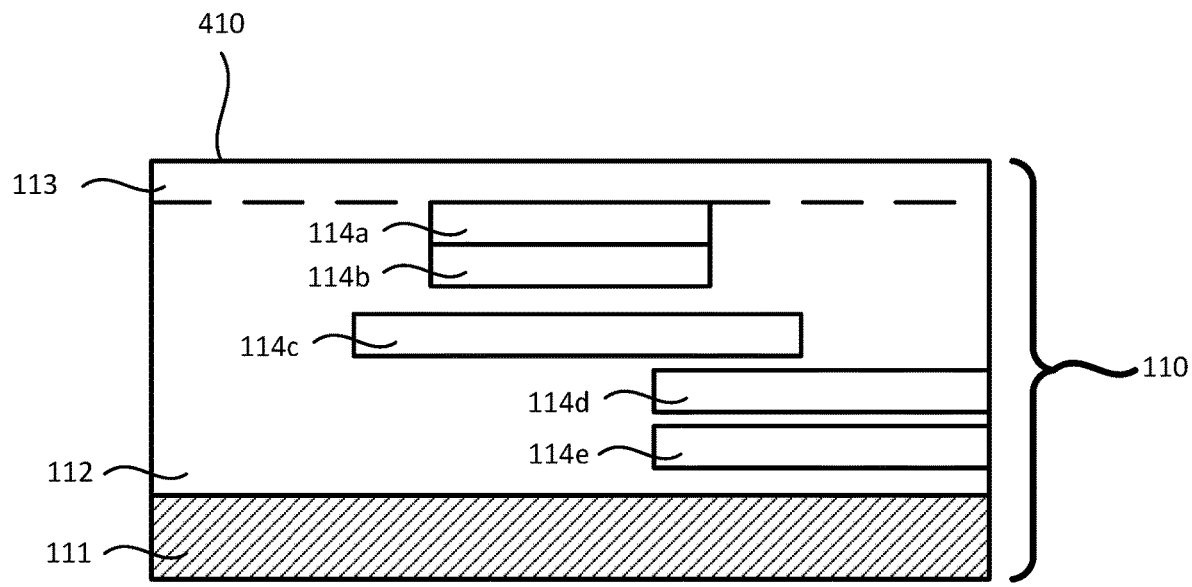
Figure 4D:
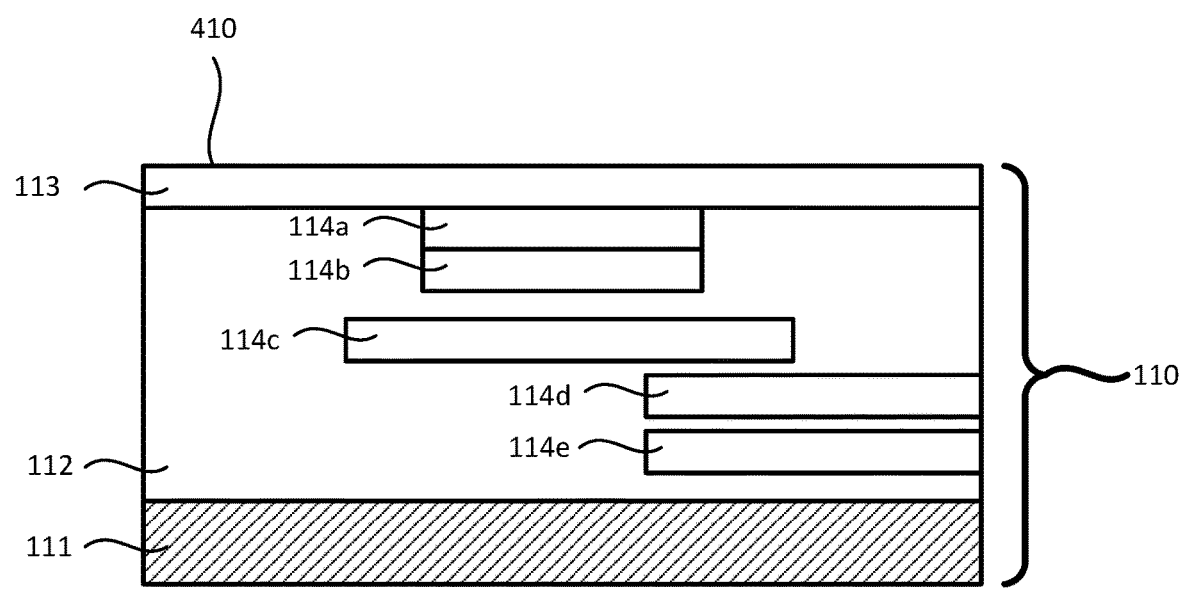

At block 320, the fabricator attaches a handle substrate 111 to the silicon component 110. The example illustrated in FIG. 4B shows a progression from FIG. 4A in which the handle substrate 111 has been bonded to an opposite side of the silicon component from the original substrate 116, and the silicon component 110 is reoriented. In various embodiments, the handle substrate 111, relative to the original substrate 116, may be a different or the same thickness, may be the same material or a different material, and may have the same or a different angle of cut for a material axis. For example, the original substrate 116 may be a Si wafer that is X nanometers (nm) thick that is cut on-axis for the Si matrix, while the handle substrate 111 is a Si wafer that is Y nm thick that is cut off-axis by Z degrees from the Si matrix.

At block 330, the fabricator removes the original substrate 116 from the silicon component 110. The fabricator may remove the original substrate 116 (and some of the underlying dielectric 112) by a physical etching process, a chemical etching process, or a combined physical and chemical etching process to reveal an exposed surface 410.

In some embodiments, the removal of the original substrate 116 defines the bonding layer 113 in the dielectric 112. For example, such as in FIG. 4C, once the original substrate 116 is removed, the top X nm of the now-exposed dielectric 112 define the bonding layer 113. In other embodiments, the fabricator adds a layer of material to where the original substrate 116 was removed from the silicon component 110 to thereby define the bonding layer 113. For example, a fabricator may apply a layer of a conductive material (e.g., Ti) to the dielectric 112 to define the bonding layer 113. In other example, such as in FIG. 4D, the fabricator may apply a layer of $Al_2O_3$ to the dielectric 112, which defines the bonding layer 113. In various embodiments, the bonding layer 113 is a predefined thickness between 5 and 30 nm (e.g., 10-20 nm) as measured between the exposed surface 410 and the first silicon core 114a.

At block 340, the fabricator bonds a III-V material to the bonding layer 113 on the exposed surface 410 of the silicon component 110. The fabricator may create a conductive or non-conductive bond between the III-V material and the silicon component 110. For example, when the bonding layer 113 is made of $Al_2O_3$, the fabricator can bond the components together via an $O_2$ plasma-assisted process to create a non-conductive bond. In another example, when the bonding layer 113 is made of $SiO_2$, the fabricator can bond the two components together via a conductive wafer bond made under vacuum with either no interface material or a conductive interface material (e.g., Ti).

In some embodiments, the fabricator bonds a base layer 421 of a III-V material (from which the III-V component 120 is formed) to the exposed surface 410, and the fabricator processes and forms the III-V component 120 according to block 350. In other embodiments, the fabricator bonds the III-V contact 121 of a pre-processed or pre-formed III-V component 120 (either as a die on a wafer or an individual component) to the silicon component 110 as the III-V material, and method 300 proceeds from block 340 to block 360. Regardless of whether using a pre-processed III-V component 120 or processing the III-V component 120 from a base layer 421, the fabricator produces a photonic platform 100, such as the example illustrated in FIG. 4G, in which the III-V component 120 is aligned with the first silicon core 114a to establish an optical path 130 between the III-V component 120 and the silicon component 110. In various embodiments, the III-V component 120 and the silicon component 110 are optically coupled via a butt-coupling or an evanescent coupling joint (e.g., prong couplers, tapered couplers, adiabatic couplers).

Figure 4E:
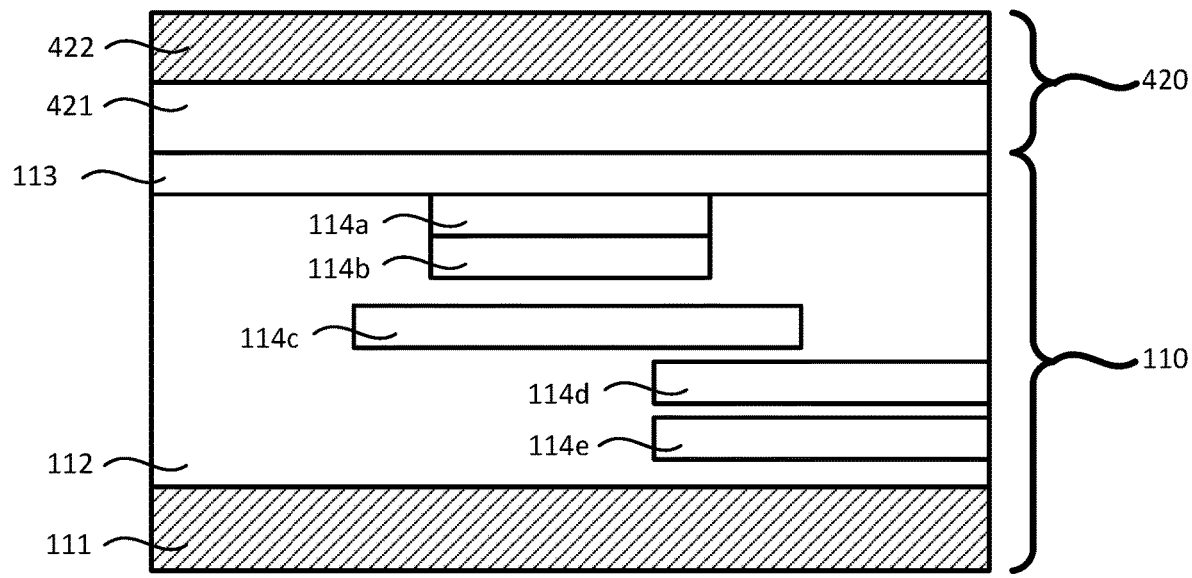

At block 350, the fabricator forms the III-V component 120 on the silicon component 110. To pattern the III-V component 120 on the silicon component 110, the fabricator starts with a base material for the III-V component 120, such as a base wafer 420. As illustrated in FIG. 4E, the fabricator mounts a base wafer 420 that includes a base layer 421 of a III-V material and a base substrate 422 to the silicon component 110. In various embodiments, the base substrate 422 may be a Si wafer, cut on axis or off axis from the material matrix of the base substrate, or another material from which the base layer 421 is formed (e.g., by epitaxial growth). Once the bond between the base layer 421 and the bonding layer 113 is established, the fabricator removes the base substrate 422 and thins the base layer 421 to a predefined thickness to leave a contact layer 430 of a desired thickness.

Figure 4F:
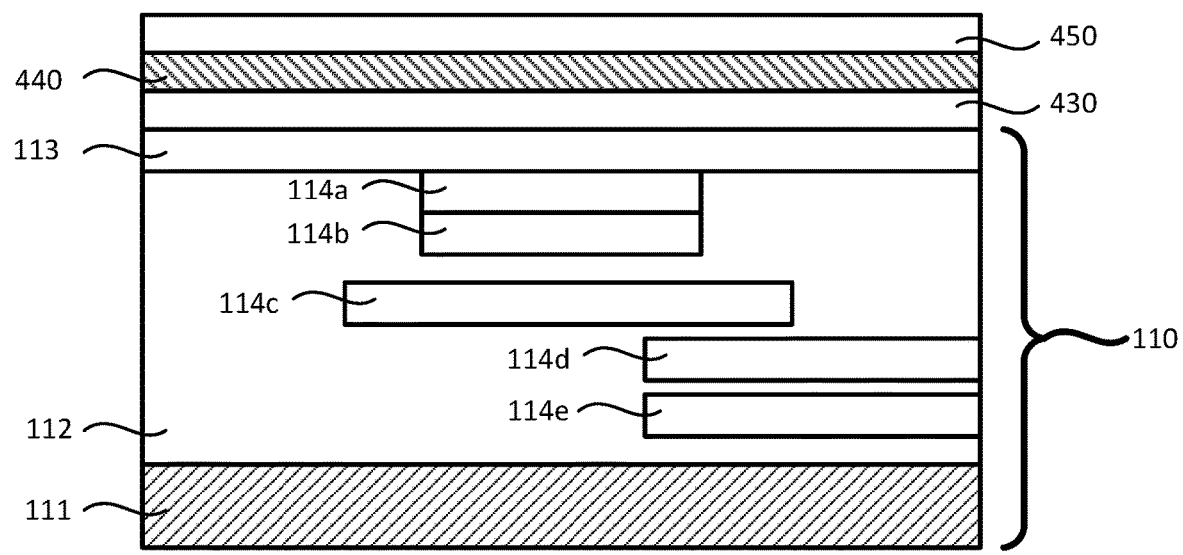

In some embodiments, such as illustrated in FIG. 4F, the fabricator may form an active layer 440 on the contact layer 430, and a cladding layer 450 of a III-V material on the active layer 440 (e.g., via epitaxial growth). In other embodiments (not illustrated), the fabricator may pattern a cavity into the contact layer 430 and/or the cladding layer 450, in which an active layer 440 is formed via selective area growth (SAG).

Once the layers of the III-V component 120 are formed, the fabricator patterns each of the layers into respective predefined shapes at locations relative to the first silicon core 114a to define an optical path 130 from the active region 122 through the III-V contact 121 and the silicon cores 114. The III-V material of the contact layer 430 remaining after patterning forms the III-V contact 121, and serves as a base for the III-V component 120. The active layer 440 remaining after patterning forms the active region 122, and the III-V material of the cladding layer 450 remaining after patterning forms the III-V cladding 123.

Figure 4G:
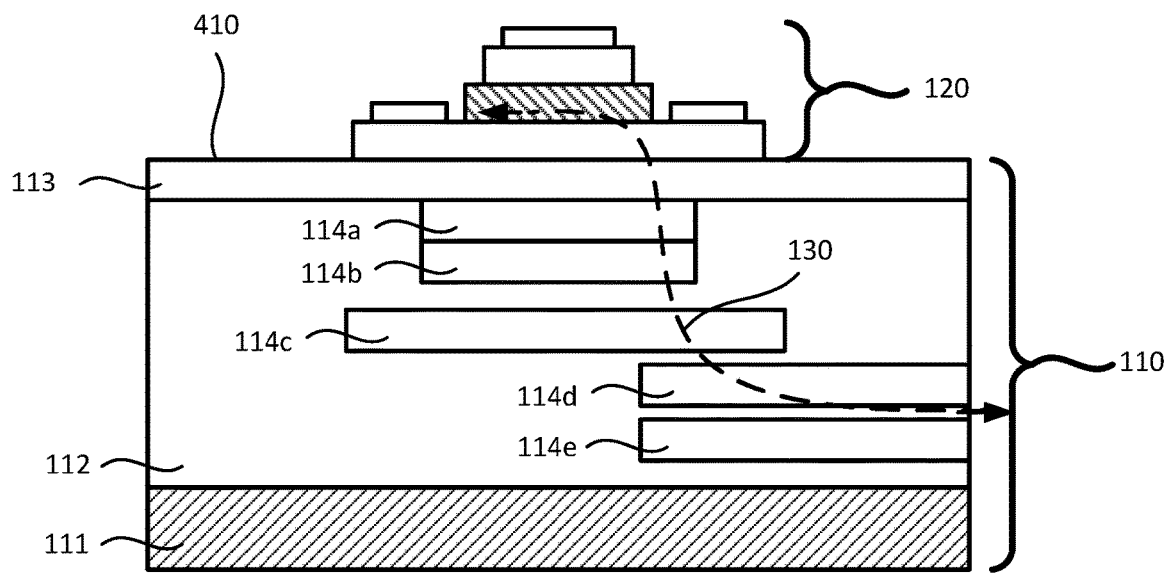

In various embodiments, the fabricator uses the alignment marks included on the silicon component 110 to guide the patterning processes and to align where the individual the parts of the III-V component 120 are formed relative to the underlying silicon cores 114 with a tolerance of less than 200 nm. The fabricator may use various physical and/or chemical etching processes to pattern the layers into a III-V component 120. After patterning the III-V component 120, the fabricator then adds metallizations 124 to the III-V contact 121 and/or the III-V cladding 123, such as is illustrated in FIG. 4G.

Figure 4H:
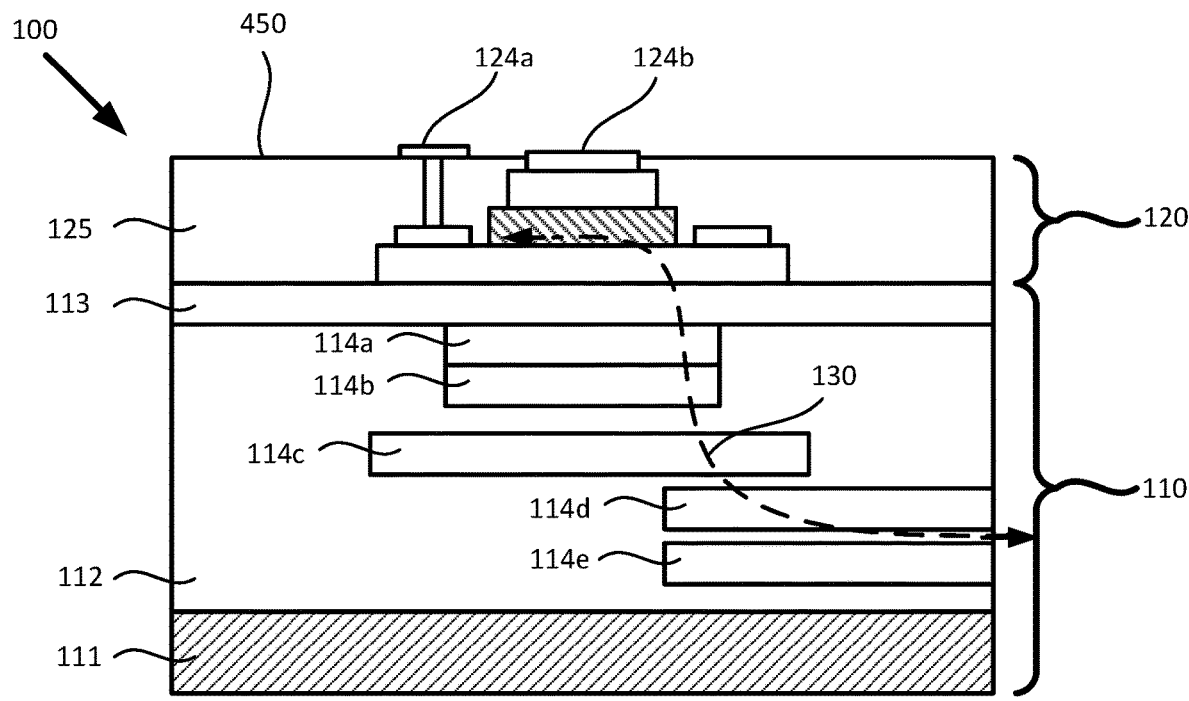

At block 360, the fabricator passivates and metalizes the photonic platform 100 to finalize assembly. For example, as illustrated in FIG. 4H, the fabricator applies the insulator 125 over the bonding layer 113 and the III-V component 120, and produces metallizations 124a, 124b that pass through the insulator 125 to make electrical contact with specified areas of the III-V component 120 and run to a free surface 460 of the insulator 125 (opposite to the formerly exposed surface 410 of the silicon component 110). Although not illustrated in FIG. 4H, the fabricator may form metallizations that make electrical contact with one or more of the silicon cores 114, for example in a different plane than that illustrated in the cross-sectional plane of FIG. 4H.

Method 300 may then conclude, and the fabricator may perform acceptance tests on the assembled photonic platforms 100, cleave the dies of photonic platforms 100 into individual assemblies, and combine the photonic platforms 100 with other optical or electrical circuits.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    providing a silicon component, comprising:
        a dielectric bonded on a first side to a substrate and to a bonding layer on a second side, opposite to the first side;
        a first silicon core disposed at a first location within the dielectric contacting the bonding layer; and
        a second silicon core disposed within the dielectric between the first silicon core and the substrate; and
    bonding a III-V material to the bonding layer such that a III-V contact defined in the III-V material, the first silicon core, and the second silicon core are aligned to form an optical path.

2. The method of claim 1, wherein bonding the III-V material to the bonding layer further comprises:
    mounting a base wafer, including a base substrate and a base layer of the III-V material, to the bonding layer; and
    forming a III-V component after mounting the base wafer to the silicon component, wherein forming the III-V component comprises:
        removing the base substrate;
        thinning the base layer to a predefined thickness to form a contact layer;
        forming an active layer on the contact layer;
        forming a cladding layer on the active layer;

patterning the contact layer into the III-V contact, the III-V contact having a first predefined shape at a first location relative to the first silicon core;

patterning the active layer into an active region of a second predefined shape at a second location relative to the first silicon core; and patterning the cladding layer into a cladding of a third predefined shape at a third location relative to the first silicon core.

3. The method of claim 1, wherein the III-V contact is part of a pre-processed III-V component that comprises an active region that is aligned with the first silicon core and second silicon core in the optical path when bonded to the bonding layer.

4. The method of claim 1, wherein the silicon component further comprises:
a third silicon core of a first waveguide; and
a fourth silicon core of a second waveguide, wherein the third silicon core and the fourth silicon core are separated from the second silicon core by a predefined distance to further define the optical path.

5. The method of claim 1, wherein the first silicon core comprises silicon doped to exhibit a first conductivity type; and
wherein the second silicon core comprises silicon doped to exhibit a second conductivity type, different from the first conductivity type.

6. The method of claim 1, wherein the first silicon core comprises a first layer of polycrystalline silicon and a layer of monocrystalline silicon; and
wherein the second silicon core comprises a second layer of polycrystalline silicon located a predefined distance from the layer of monocrystalline silicon.

7. The method of claim 1, further comprising:
bonding a handle substrate to the first side of the dielectric as the substrate; and
removing an original substrate from the second side of the dielectric to expose a surface of the dielectric, wherein a predefined distance between the surface thereby exposed and the first silicon core defines the bonding layer.

8. The method of claim 1, wherein the bonding layer comprises a predefined thickness of $SiO_2$, and wherein bonding the III-V contact to the bonding layer further comprises:
forming, under vacuum, a non-conductive bond via $O_2$ plasma between the bonding layer and the III-V contact.

9. The method of claim 1, further comprising:
bonding a handle substrate to the first side of the dielectric as the substrate; and
removing an original substrate from the second side of the dielectric to expose a surface of the dielectric;
applying a layer of $Al_2O_3$ to the surface thereby exposed between 5 nm and 30 nm thick to define the bonding layer; and
wherein bonding the III-V contact to the bonding layer further comprises forming a conductive bond between the bonding layer and the III-V contact.

10. A photonic platform, comprising:
a silicon component;
a III-V component;
a bonding layer contacting the silicon component on a first side and the III-V component on a second, opposite side;
wherein the silicon component comprises:
a silicon substrate;
a dielectric, contacting the silicon substrate on first face and the bonding layer on a second face, opposite to the first face;
a first silicon core disposed in the dielectric and contacting the bonding layer; and
a second silicon core disposed in the dielectric between the first silicon core and the silicon substrate; and
wherein the III-V component comprises:
a III-V cladding;
a III-V contact, having a first side and a second side, wherein the first side contacts the bonding layer; and
an active region, disposed on the second side of the III-V contact and separating the III-V contact from the III-V cladding, wherein the active region is located relative to the first silicon core and the second silicon core to define an optical path that includes the active region, the first silicon core, and the second silicon core.

11. The photonic platform of claim 10, wherein the III-V component is formed on the silicon component, and wherein the III-V contact has been bonded to the bonding layer before the active region and the III-V cladding are formed.

12. The photonic platform of claim 10, wherein the bonding layer comprises Silicon Dioxide and a bond between the bonding layer and the III-V contact is conductive.

13. The photonic platform of claim 10, wherein the silicon component further comprises:
waveguides, wherein the waveguides are located in the dielectric between the second silicon core and the silicon substrate and wherein the optical path travels through the waveguides.

14. The photonic platform of claim 10, wherein the first silicon core comprises a first layer of polycrystalline silicon in contact with the bonding layer on a first face and in contact with a layer of monocrystalline silicon on a second face opposite to the first face; and
wherein the second silicon core comprises a second layer of polycrystalline silicon.

15. The photonic platform of claim 10, wherein the first silicon core comprises silicon doped to exhibit a first conductivity type; and
wherein the second silicon core comprises silicon doped to exhibit a second conductivity type, opposite to the first conductivity type.

16. The photonic platform of claim 10, wherein the bonding layer is between 5 nm and 30 nm thick.

17. The photonic platform of claim 10, further comprising:
an insulator, wherein the III-V contact, the active region, and the III-V cladding are disposed within the insulator; and
at least one metallization in electrical contact with the III-V component through the insulator.

18. A wafer, comprising:
a plurality of dies defined on a substrate, wherein each die of the plurality of dies comprises:
a bonding layer;
a dielectric, separating the substrate from the bonding layer;
a first silicon core embedded in the dielectric and contacting the bonding layer; and
a second silicon core embedded in the between the first silicon core and the substrate; and
a plurality of III-V components, wherein each III-V component of the III-V components comprises:
a III-V contact having a first side and a second side;

an active region connected to the first side of the III-V contact; and wherein the second side of the III-V contact for each III-V component of the plurality of III-V components is bonded to the bonding layer of a corresponding die of the plurality of dies to define an optical path traveling from the active region to the first silicon core and the second silicon core.

19. The wafer of claim 18, wherein the plurality of III-V components are defined as a second plurality of dies on a III-V component wafer bonded to a silicon component wafer on which the plurality of dies is defined.

20. The wafer of claim 18, wherein the plurality of III-V components are individually patterned from a III-V material bonded to the bonding layer of the corresponding die of the plurality of dies.

* * * * *

UNITED STATES PATENT AND TRADEMARK OFFICE
CERTIFICATE OF CORRECTION

PATENT NO. : 10,782,475 B2
APPLICATION NO. : 16/433846
DATED : September 22, 2020
INVENTOR(S) : Jock T. Bovington et al.

Page 1 of 1

It is certified that error appears in the above-identified patent and that said Letters Patent is hereby corrected as shown below:

In the Specification

In Column 1, Line 54, delete "FIG." and insert -- FIGS. --, therefor.

In Column 4, Line 52, delete "FIG." and insert -- FIGS. --, therefor.

In the Claims

In Column 12, Line 63, in Claim 18, delete "in the between" and insert -- in between --, therefor.

Signed and Sealed this
Third Day of November, 2020

Andrei Iancu
*Director of the United States Patent and Trademark Office*